(12) United States Patent
Kang

(10) Patent No.: US 7,188,955 B2
(45) Date of Patent: Mar. 13, 2007

(54) PROJECTION OPTICAL SYSTEM

(75) Inventor: Ho Joong Kang, Oeijungbu-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/844,451

(22) Filed: May 13, 2004

(65) Prior Publication Data

US 2005/0001987 A1     Jan. 6, 2005

(30) Foreign Application Priority Data

May 14, 2003    (KR) .................. 10-2003-0030674

(51) Int. Cl.
*G03B 21/14* (2006.01)
(52) U.S. Cl. .................. 353/33; 353/81; 348/757
(58) Field of Classification Search .............. 353/33, 353/20, 84, 81, 98, 99, 119, 31; 348/766, 348/771, 787, 789, 791, 794, 756–760
See application file for complete search history.

(56) References Cited

U.S. PATENT DOCUMENTS

| 6,174,060 B1 * | 1/2001 | Imaoka et al. ............... 353/31 |
| 6,262,851 B1 * | 7/2001 | Marshall ..................... 359/634 |
| 6,281,866 B1 * | 8/2001 | Robinson et al. ............. 345/87 |
| 6,299,312 B1 * | 10/2001 | Choi et al. .................... 353/31 |
| 6,481,852 B2 * | 11/2002 | Osaka ......................... 353/31 |
| 6,666,557 B1 * | 12/2003 | Choi ........................... 353/31 |
| 6,910,773 B2 * | 6/2005 | Nakashima et al. .......... 353/20 |
| 2002/0191154 A1 * | 12/2002 | Shahzad et al. .............. 353/20 |
| 2003/0081179 A1 * | 5/2003 | Pentico et al. ................ 353/20 |
| 2004/0066492 A1 * | 4/2004 | Nakashima et al. .......... 353/20 |
| 2004/0252285 A1 * | 12/2004 | Lang et al. ................... 353/94 |
| 2005/0185144 A1 * | 8/2005 | Imahase et al. .............. 353/31 |

* cited by examiner

*Primary Examiner*—W. B. Perkey
*Assistant Examiner*—Andrew Sever
(74) *Attorney, Agent, or Firm*—Birch, Stewart, Kolasch & Birch, LLP

(57) ABSTRACT

A reflective lighting optical system minimizes a back focusing distance and a depth of the system, and improves a lighting efficiency by disposing a wire grid type PBS (Polarized Beam Splitter) at an oblique angle with respect to a short side of an imager.

15 Claims, 15 Drawing Sheets

Screen　　　　　　　　　　　　　　　　　　　　　　　　LCoS panel

PROJECTION OPTICAL SYSTEM

This Non-provisional application claims priority under 35 U.S.C. § 119(a) on Patent Application No(s). 10-2003-30674 filed in Korea on May 14, 2003, the entire contents of which are hereby incorporated by reference.

BACKGROUND OF THE INVENTION

1. Field of the Invention

The present invention relates to a reflective lighting optical system, and more particularly, to a reflective lighting optical system that can minimize a back focusing distance and a height of the system, and improve a lighting efficiency by disposing a wire grid type PBS (Polarized Beam Splitter) at an oblique angle with respect to a short side of an imager.

2. Description of the Related Art

Recently, it has become a general tendency that a display device is designed to be slim and lightweight while having a large-sized screen. Particularly, the realization of the display device having such a large-sized screen becomes a major task in the display field. To date, a projection TV is well known as a typical display device having the large-sized screen.

The projection TVs are classified into a cathode ray tube (CRT) projection TV and a liquid crystal display (LCD) projection TV. The LCD projection TVs can be further classified into a system using a transmissive LCD and a system using a reflective LCD (liquid crystal on silicon (LCoS)).

The system using the reflective LCD has an advantage in that a panel thereof can be inexpensively made as compared with the system using the transmittable LCD.

A conventional projection system and a lighting system will be described hereinafter in conjunction with the accompanying drawings.

FIGS. 1 to 4 show a variety of conventional 3-panel type reflective LCD lighting systems.

Referring first to FIG. 1, as one of lighting systems for a projection TV using a reflective LCD, a reflective lighting system of a 3-PBS system is designed such that light radiated from a lamp 1 is directed to a first dichroic mirror 2 via a condensing lens. Red and green light rays of the light directed to the first dichroic mirror 2 are reflected on the first dichroic mirror 2 while a blue light ray passes through the same.

The reflected red and green light rays are directed to a second dichroic mirror 3. The green light ray is reflected on the second dichroic mirror 3 while the red light ray passes through the same. The red, green and blue light rays are then incident to first, second and third PBS 4a, 4b and 4c, which are arranged before an R, G, B LCoS Panel.

The incident red, green and blue light rays are then reflected on the first, second and third PBS 4a, 4b and 4c, respectively, and directed to first, second and third LCoS panels 5a, 5b and 5c, respectively. The red, green and blue light rays respectively directed to the first, second and third PBS 4a, 4b and 4c are phase-shifted to pass through the first, second and third PBS 4a, 4b and 4c, respectively.

The red, green and blue light rays are synthesized by an X-prism and incident to a projection lens.

As described above, a light path of the reflective lighting system of the 3-PBS system is comprised of three stages; a first stage defined by the lamp 1 and the first dichroic mirror 2, a second stage defined by the second dichroic mirror 3, the second LCoS panel 5b and the second PBS 4b, and a third stage defined by the first and second LCoS panels 5a and 5c, the X-prism 6 and the first and third PBSs 4a and 4c. Such three stages cause a depth of the system to be increased.

Furthermore, the system needs a large number of parts such as two dichroic mirrors, one mirror, one relay lens for correcting a path difference between the red, green and blue light rays, three PBS, and one X-prism.

FIG. 2 shows another conventional 3-panel type reflective LCD lighting system of a color quad system using a color selector instead of the relay system.

The lighting system depicted in FIG. 2 is designed to utilize a color selector to eliminate a light path difference between red, green and blue light rays. That is, while light radiated from a lamp 7 passes through a first color selector 8a, a blue light ray is changed into secondary wave (S wave) while red and green light rays are outputted as primary wave (P wave).

The blue light ray changed into the secondary wave is reflected on a first PBS 9a to be directed to a second PBS 9b in front of a blue LCoS panel, and the red and green light rays of P wave transmit the first PBS 9a.

The blue light ray is then reflected on the second PBS 9b, incident to a third LCoS panel 10c, and then is reflected on the third LCoS panel 10c so that the phase of the blue light ray is shifted. The phase-shifted blue light ray passes through the second PBS 9b, after which it is incident to a fourth PBS 9d via a fourth color selector 8d.

The green light ray of the primary wave is changed again into the secondary wave while passing through a second color selector 8b and is then incident to a third PBS 9c. At this time, the red light ray of the primary wave is incident to the third PBS 9c without any change. Therefore, the green light ray is reflected on the third PBS 9c while the red light ray passes through the third PBS 9c, after which the red and green light rays are incident to first and second LCoS panels 10a and 10b, respectively.

The red and green light rays incident to the respective first and second LCoS panels 10a and 10b are reflected thereon to be phase-shifted. The green and red light rays that are phase-shifted are incident again to the third PBS 9c and synthesized, and made to have an identical polarizing state, after which they are incident to the fourth PBS 9d.

The red, green and blue light rays directed to the fourth PBS 9d are synthesized by a P/S separation/synthesize property of the PBS. The synthesized light is incident to a projection lens.

As described above, since a light path of the 3-panel type reflective LCD lighting system of the color quad system is configured in a two stages structure without using the relay system, the structure thereof can be simplified. However, four color selectors and four PBSs are required, increasing the manufacturing costs.

Furthermore, in the course of the P/S separation/synthesize process by the PBS, there may be a photoelasticity problem causing the incident wave to have a different ray of polarized light when the incident wave is outputted.

In order to solve the above-described problems while enhancing lighting efficiency using illumination light having an optic angle, a lighting system using a wire grid type PBS depicted in FIG. 5 has been proposed.

FIG. 3 shows a conventional lighting system using a wire grid type PBS.

As shown in the drawing, a lighting system is configured such that light irradiated from a lamp 11 is directed to a first dichroic mirror 12a via a condensing lens. Red and green light rays of the light directed to the first dichroic mirror 12a pass through the first diebroic mirror 12a while a blue light ray is reflected on the same.

The red and green light rays passing through the first dichroic mirror 12a are changed into primary and secondary waves, respectively, while passing through a color selector 14 and are then directed to a second wire grid type PBS 13b. The red light ray changed into the primary wave passes through the second wire grid type PBS 13b while the green light ray is reflected thereon, after which the red and green light rays are incident to the first and second LCoS panels 15a and 15b, respectively, and are then phase-shifted by being reflected on the first and second LCoS panels 15a and 15b, respectively. The red and green light rays that are phase-shifted are incident to a projection lens via the second wire grid type PBS 13b and the second dichroic mirror 12b.

In addition, the blue light ray reflected on the first dichroic mirror 12a is directed to a first wire grid type PBS 13b and is then reflected thereon to be directed to a third LCoS panel 15c. The blue light ray directed to the third LCoS panel 15c is phase-shifted by being reflected thereon and is then incident to the projection lens after being reflected on the second diachronic mirror 12b via the first wire grid type PBS 13a.

FIG. 4 shows another conventional lighting system using a wire grid type PBS.

As shown in the drawing, a lighting system is designed such that light irradiated from a lamp 16 is directed to a first dichroic mirror 17 via a condensing lens. Red and green light rays of the light directed to the first dichroic mirror 17 are reflected thereon while a blue light ray passes through the same.

The blue light ray is incident to a third LCoS panel 21c via a second relay lens 18b, a reflective mirror, a third relay lens 18, and a third wire grid type PBS 20c.

The blue light ray is then incident to an X-prism 22 via the third wire grid type PBS 20c after it is reflected on and phase-shifted by the third LCoS panel 21c.

The reflected red and green light rays are directed to a second dichroic mirror 19 via a relay lens 18a. The green light ray is reflected on the second dichroic mirror 19 while the red light ray passes through the same.

The reflected green light ray is reflected on a second wire grid type BPS 20b and is then incident to a second LCoS panel 21b. The green light ray is phase-shifted by the second LCoS panel 21b to be directed to the X-prism via the second wire grid type PBS 20b.

The red light ray passing through the second dichroic mirror 19 is reflected on a first wire grid type BPS 20a and is then incident to a first LCoS panel 21a. The green light ray is phase-shifted by the first LCoS panel 21a to be directed to the X-prism via the first wire grid type PBS 20a.

The red, green and blue light rays are directed to a projection lens after being synthesized by the X-prism.

As shown in FIG. 5, the wire grid type PBS is composed of a glass plate on which a predetermined pattern is formed.

The predetermined pattern formed on the glass plate has a size of several tens nm.

When the lighting system is structured using such a wire grid type PBS, a variety of problems such as a photoelasticity problem, a cost problem and a lighting efficiency problem can be solved. However, an astigmatism problem is incurred.

That is, when the glass plate is inserted in the imaging lens system at an oblique angle, astigmatism that prevents light rays from focusing clearly at one point on the retina, resulting in blurred vision, is generated.

Particularly, the astigmatism becomes more severe when the light passes through the wire grid type PBS after being reflected on the LCoS panel.

Referring to FIG. 3, the green light ray reflected on the second LCoS panel 15b passes through the second wire grid type PBS 13b, and the blue light ray reflected on the third LCoS passes through the first wire grid type PBS 13a.

Referring to FIG. 4, the light rays are reflected on the first, second and third LCoS panels 21a, 21b and 21b pass through the first, second and third wire grid type PBS 20a, 20b, 20c.

As described above, when the light ray passes through the wire grid type PBS after being reflected on the LCoS panel, the astigmatism is incurred.

The astigmatism incurred when the light ray reflected on the LCoS panel passes through the wire grid type PBS will be described hereinafter with reference to FIGS. 6 to 8.

FIG. 6 shows a layout diagram of the projection lens when the light ray passes through the wire grid type PBS, while FIGS. 7 and 8 show a wave shape in the case of FIG. 6.

A case where a light rays passes through a wire grid type PBS inserted between a projection lens and an LCoS panel at an oblique angle will be described hereinafter.

Aberration incurred when the light ray passes through the wire grid type PBS inserted between the projection lens and the LCoS panel at the oblique angle as shown in FIG. 6 is as shown in FIGS. 7 and 8.

That is, as shown in the drawings, there is a problems that astigmatism is incurred when the light ray passes through the wire grid type PBS inserted between the projection lens and the LCoS panel at the oblique angle.

As described above, the conventional reflective lighting systems have a variety of problems.

That is, the reflective lighting system of the 3-PBS system as illustrated in FIG. 1 has problems that the depth of the system is increased due to the three light path portions and a number of components are required.

Although the reflective lighting system of the color quad system as illustrated in FIG. 2 has an advantage of a simplified structure due to the two light path portions, it has a problem that the manufacturing cost is increased due to the four color selectors and the four PBS.

Furthermore, in the course of the P/S separation/synthesize process by the PBS, there may be a photoelasticity problem causing the incident wave to have a different ray of polarized light when the incident wave is outputted.

Although the reflective lighting systems each using the wire grid type as illustrated in FIGS. 3 and 4 solve the problems such as the photoelasticity problem, the cost problem and the lighting efficiency problem, it has an astigmatism problem.

In order to reduce the astigmatism, a scheme for reducing a thickness of each of the wire grid type PBS or a scheme for disposing two wire grid type PBSs in a different direction has been proposed.

However, when the thickness of the PBS is reduced, the glass plate may be deformed. In addition, even when the PBSs are disposed in a different direction, the astigmatism is not compensated for, but a shape of a spot is formed in a circular-shape, increasing the size of the spot. Furthermore, since the PBSs have a different angle from each other, the lighting system cannot be structured on a single plane.

SUMMARY OF THE INVENTION

Accordingly, the present invention is directed to an optical system for a reflective lighting optical system that substantially obviates one or more problems due to limitations and disadvantages of the related art.

An object of the present invention is to provide a reflective lighting optical system that can prevent astigmatism and improve lighting efficiency by allowing red, green and blue signals reflected on an LCoS panel to be incident to a projection lens without passing through a wire grid type PBS.

Another object of the present invention is to provide a reflective lighting system that can minimize a depth of a whole optical system using a film-type optical component such as a wire grid type PBS by minimizing a back focus length of a projection lens.

Still another object of the present invention is to provide an optical system that uses a wire grid type PBS for a lighting system, not affecting an optical performance and minimizing a height of the system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a reflective lighting optical system comprising: a lighting part disposed at a lower side of the optical system, the lighting part including a lamp for radiating light rays and a dichroic mirror for allowing the light rays of red, green and blue, which are radiated from the lamp and of which polarization components are aligned, to be divided into there respective paths; and a synthesizing part disposed at an upper side of the optical system, the synthesizing part including an imager for phase-shifting and reflecting the red, green and blue light ray, a wire grid type PBS at an oblique angle with respect to a short side of the imager, for transmitting the red, green and blue lights divided into there respective paths by the dichroic mirror and for reflecting the red, green and blue light rays phase-shifted by and reflected on the imager, and an X-prism for synthesizing the red, green and blue light to allow the synthesized light to be incident to a projection lens. In another aspect of the present invention, there is provided a reflective lighting optical system comprising a lamp for radiating light; a dichroic mirror for allowing the light rays of the red, green and blue, which are radiated from the lamp and of which polarization components are aligned, to be divided into there respective paths; an imager for phase-shifting and reflecting the red, green and blue light rays; a wire grid type PBS disposed at an oblique angle with respect to a short side of the imager, for transmitting the red, green and blue light rays divided into there respective paths by the dichroic mirror and for reflecting the red, green and blue light rays phase-shifted and reflected on the imager; and an X-prism for synthesizing the red, green and blue light rays reflected on the wire grid type PBS to allow the synthesized light to be incident to a projection lens.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 9:
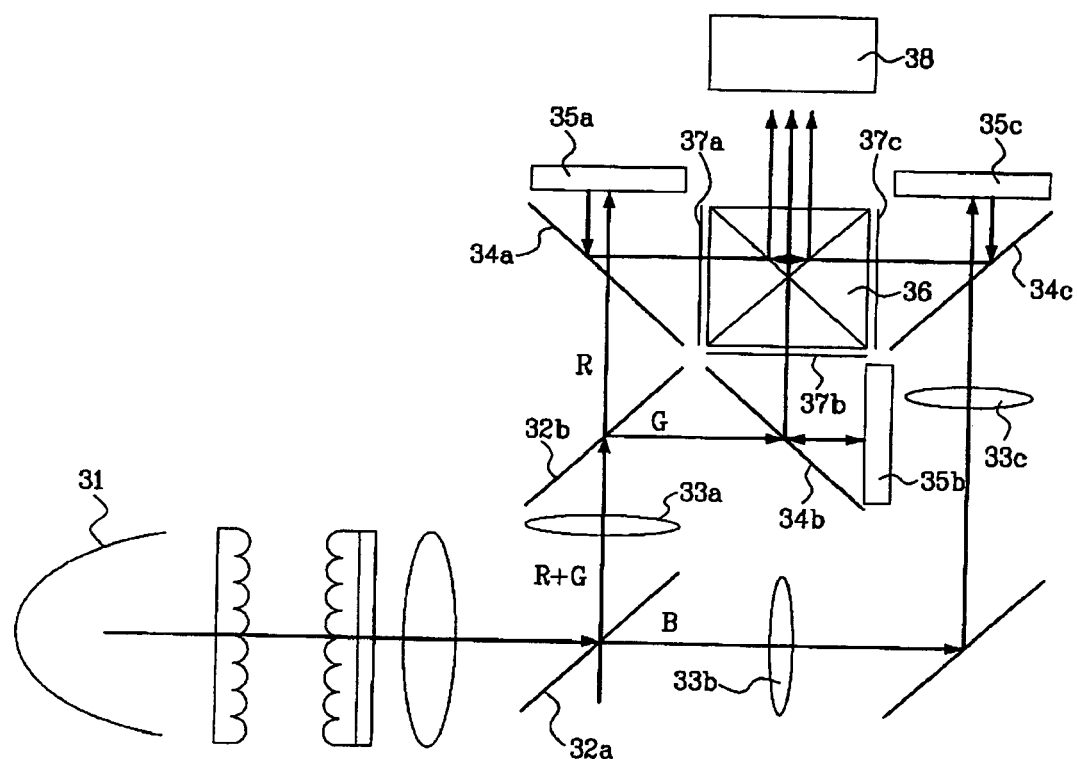
FIG. 9 is a schematic diagram of a reflective lighting optical system according to a first embodiment of the present invention.

Reference will now be made in detail to the preferred embodiments of the present invention, examples of which are illustrated in the accompanying drawings. FIG. 9 shows a schematic diagram of a reflective lighting optical system according to a preferred embodiment of the present invention.

The present invention relates to a lighting system of a projection display device using an LCoS panel that is a kind of the reflective LCD, and provides a three-panel type reflective lighting system using a wire grid type PBS, having an excellent performance and a low manufacturing cost.

In the present invention, a film type wire grid type PBS is used. At this time, in order to prevent astigmatism from being generated, light rays of R, G and B that are reflected on the LCoS panel and incident to the projection lens do not pass through the wire grid type PBS but are reflected and then incident to the X-prism.

In other words, to solve contrast lowering and light amount lowering problems due to the conventional photoelasticity of the PBS, a wire grid type PBS that is a polarization film providing the same function as the conventional PBS is used.

The wire grid type PBS enables to realize a P/S division/synthesis at an F/# less than that required for realizing the P/S division/synthesis by the conventional PBS, thereby realizing the brighter lighting system. Also, in order to enhance the contrast of light reflected on the film type wire grid type PBS and incident to the projection lens, the inventive optical system employs a structure where a polarization film is interposed between the X-prism and the wire grid type PBS.

Here, F/# indicates the angle of illumination light. The decrease in F/# causes the angle of the illumination light to be increased. Thus, when the angle of the illumination light is increased, much more amount of light can be received.

As shown in the drawing, a reflective lighting optical system includes: a lamp 31 for radiating red R, green G and blue B light rays; a first dichroic mirror 32a for dividing light radiated from the lamp 31, and of which polarization component is aligned in a direction through a polarization converting system (PCS), into two light paths by a) transmitting a blue light ray radiated from the lamp 31 and b) reflecting green and red light rays; a second dichroic mirror 32b for transmitting the reflected red light ray passing through a relay lens 33a from yellow light ray (G+R) reflected on the first dichroic mirror 32a and for reflecting the reflected green light ray passing through the relay lens 33a; a second wire grid type PBS 34b for transmitting the green light ray reflected on the second dichroic mirror 32b to a second LCoS panel 35b; a first wire grid type PBS 34a for transmitting the red light ray passing through the second dichroic mirror 32b to a first LCoS panel 35a; a third wire grid type PBS 34c for transmitting the blue light ray passing through the first dichroic mirror 32a to a third LCoS panel 35c via a second relay lens 33b, a mirror and a third relay lens 33c; an X-prism 36 for synthesizing the red, green and blue light rays that are reflected on the first, second and third LCoS panels 35a, 35b and 35c, respectively, and further reflected on the first, second and third wire grid type PBSs 34a, 34b and 34c, respectively, and for transmitting the synthesized light to a projection lens 38; and first, second and third polarizing plates 37a, 37b and 37c for polarizing the red, green and blue light rays before the red, green and blue light rays are incident to the X-prism 36.

In the reflective lighting system constructed as above, the yellow light ray (green+red) first reflected on the first dichroic mirror 32a are incident to the second dichroic mirror 32b. The green light ray is reflected on the second dichroic mirror 32b to be incident to the second LCoS panel 35b through the second wire grid type PBS 34b. The red light ray passes through the second dichroic mirror 32b to be incident to the first LCoS panel 35a through the first wire grid type PBS 34a.

The blue light ray passing through the first dichroic mirror 32a is incident to the third LCoS panel 35 via relay lenses 33b and 33c and the third wire grid type PBS 34c.

The red, green and blue light rays respectively incident to the first, second and third LCoS panels 35a, 35b and 35c are reflected on the same and are then incident to the X-prism 36 after being reflected on the first, second and third wire grid type PBSs 34a, 34b and 34c, respectively.

Here, the red, green and blue light rays are polarized by the first, second and third polarizing plates 37a, 37b and 37c before they are incident to the X-prism 36, whereby the contrast can be improved.

As the reflective lighting optical system structured as in the above employs a film type optical component such as the wire grid type PBS, contrast and light intensity problems that may be caused by the photoelasticity of the conventional PBS can be solved while the optical performance is not deteriorated.

In addition, an astigmatism characteristic of the above-described reflective lighting optical system will be described hereinafter.

Figure 1:
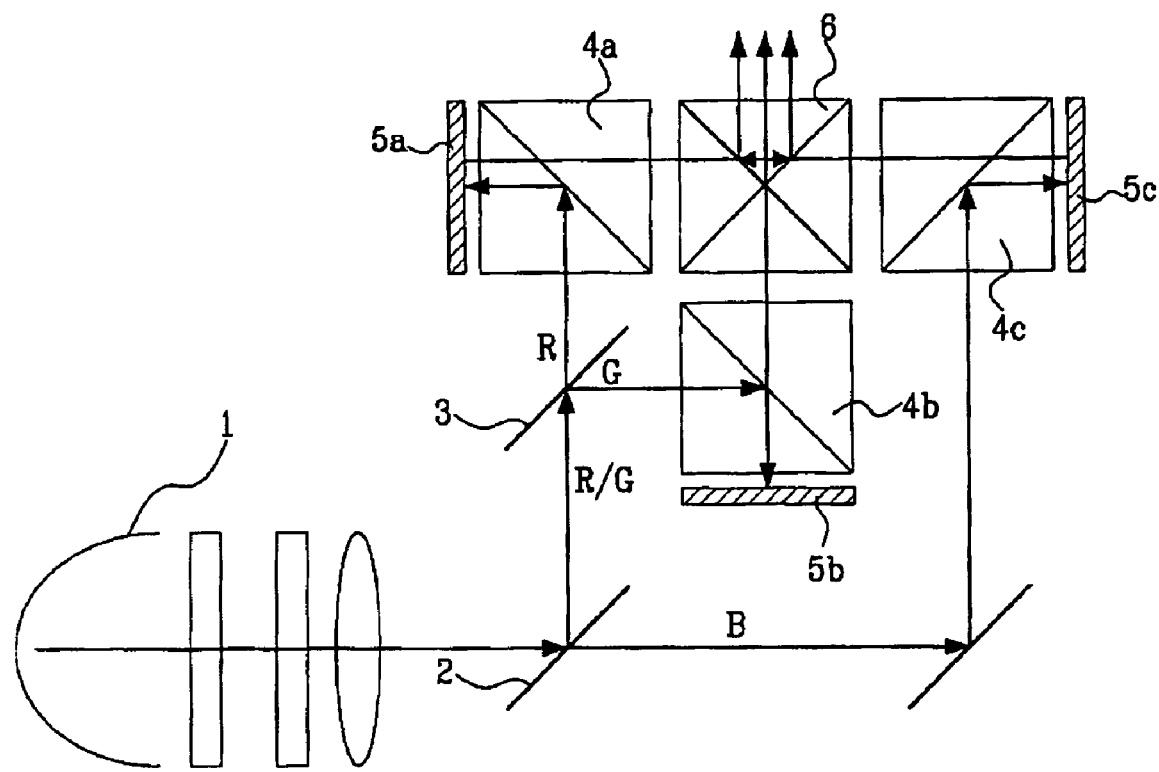
FIGS. 1 to 4 are schematic views illustrating a variety of conventional 3-panel reflective LCD lighting systems.
Figure 2:
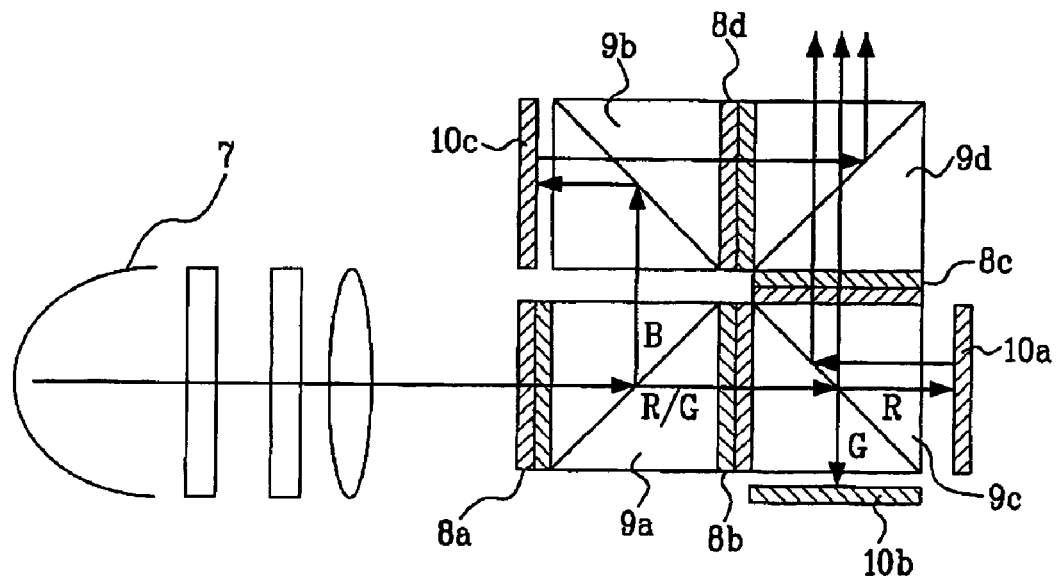
Figure 3:
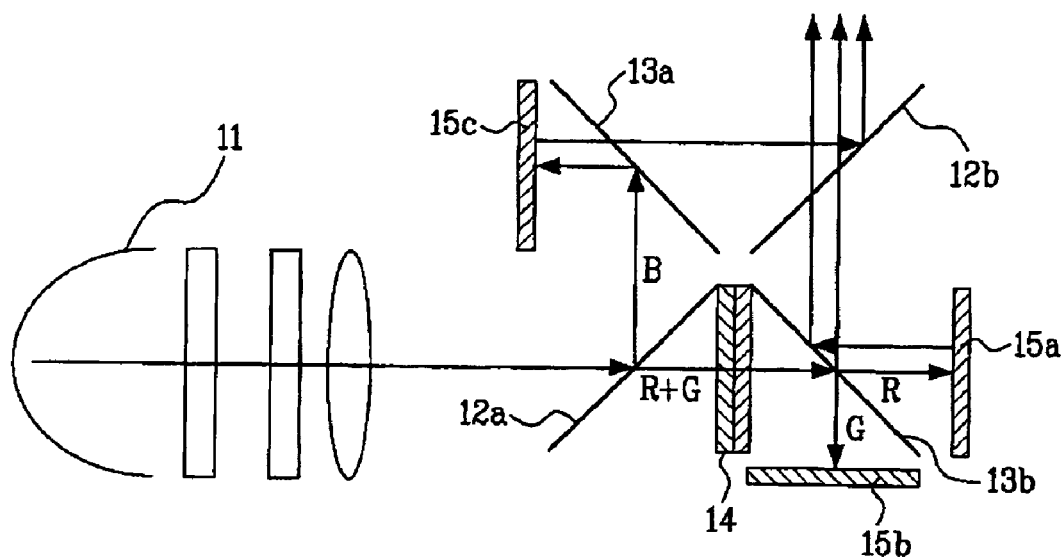
Figure 4:
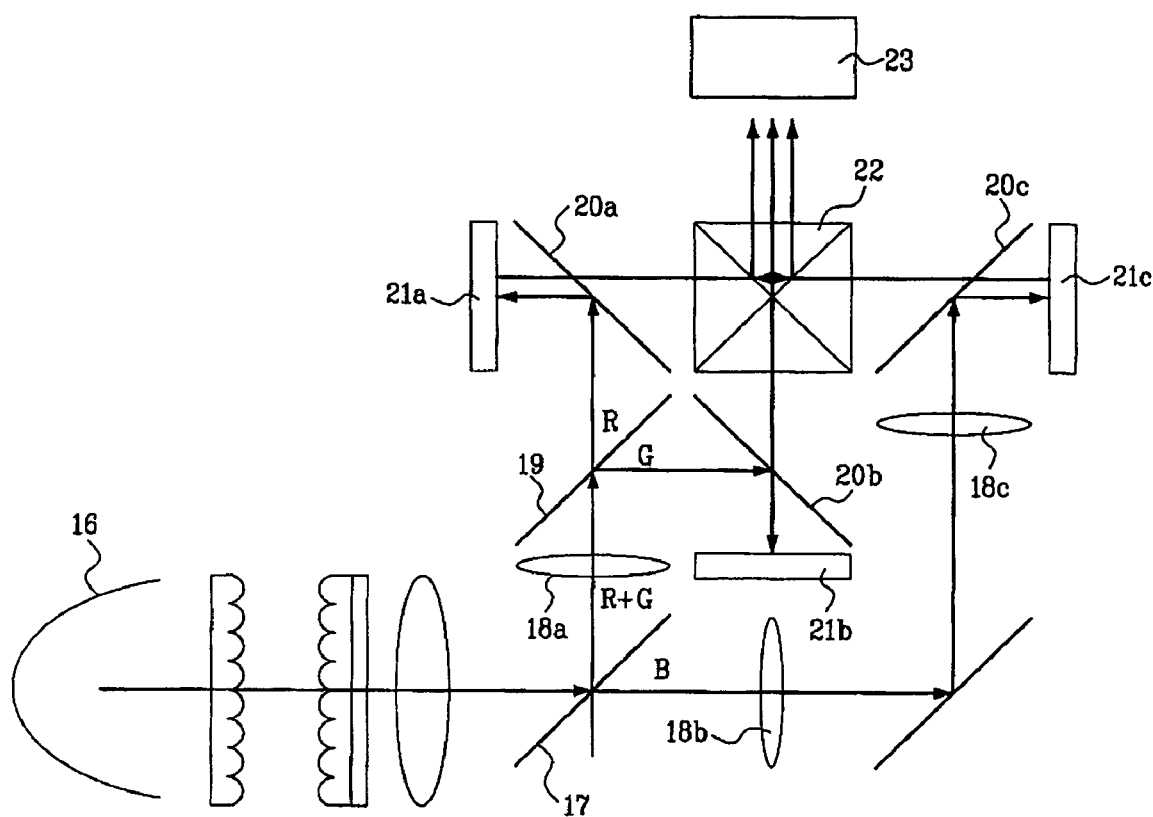
Figure 5:
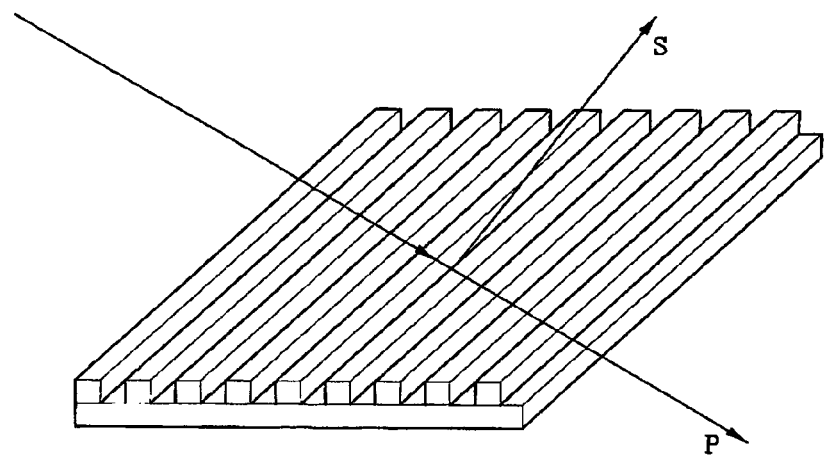
FIG. 5 is a perspective view of a wire grid type PBS.
Figure 6:
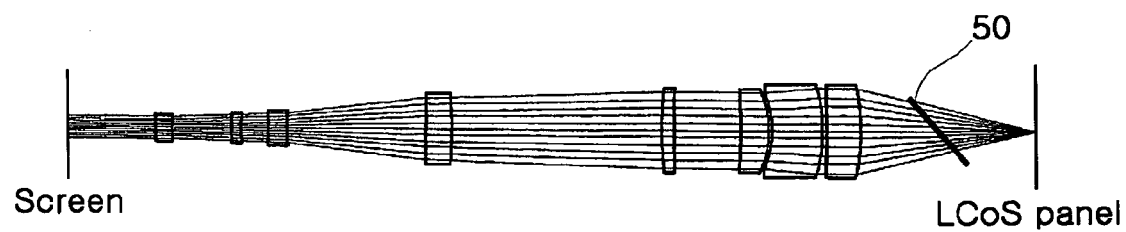
FIG. 6 is a layout diagram of a projection lens when a light ray passes through a wire grid type PBS.
Figure 7:
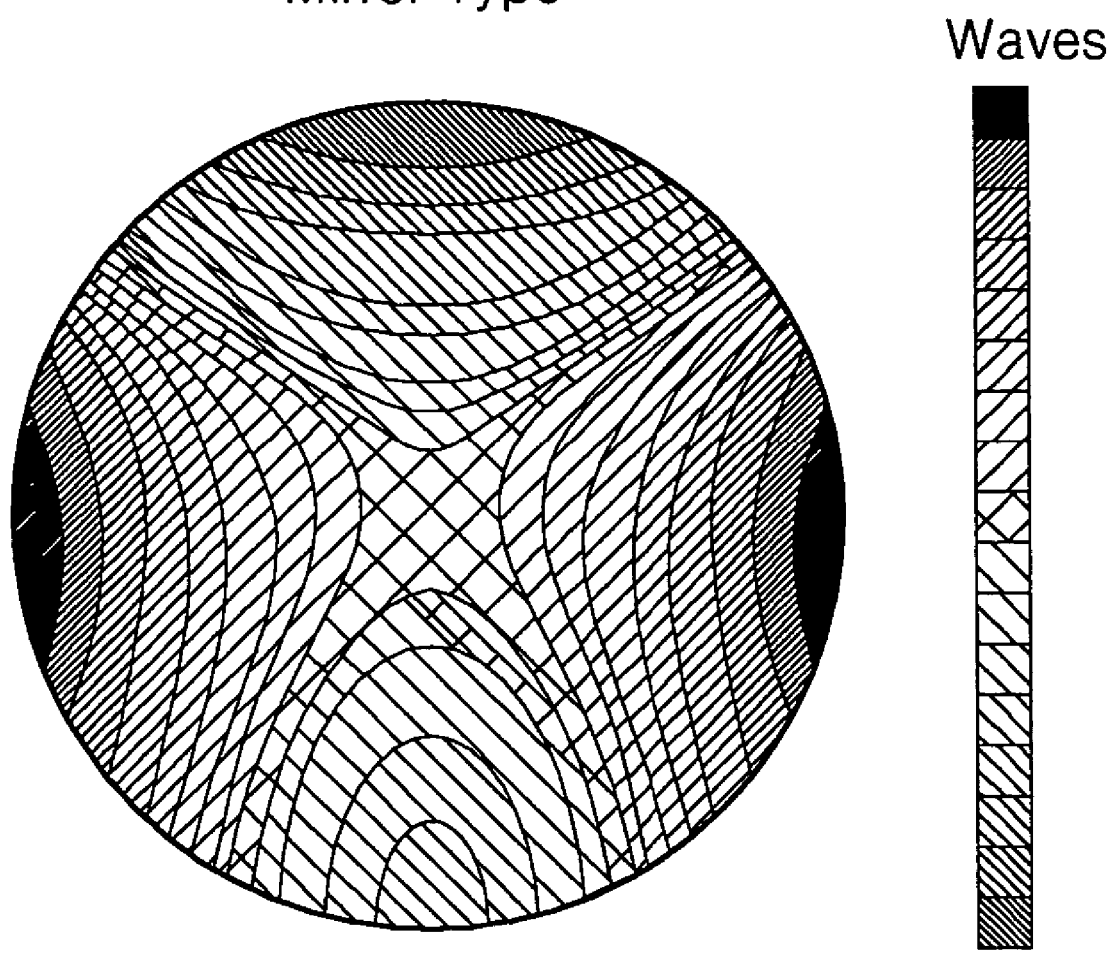
FIGS. 7 and 8 are views illustrating a wave shape in the case of FIG. 6.
Figure 8:
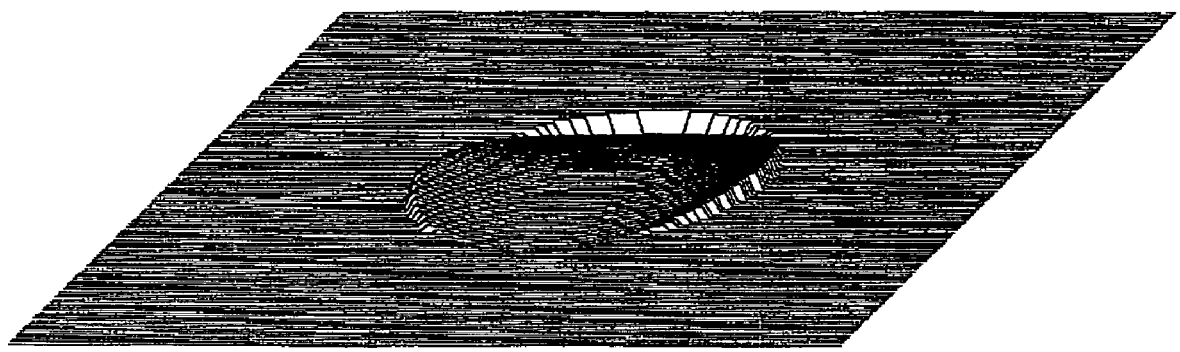
Figure 10:
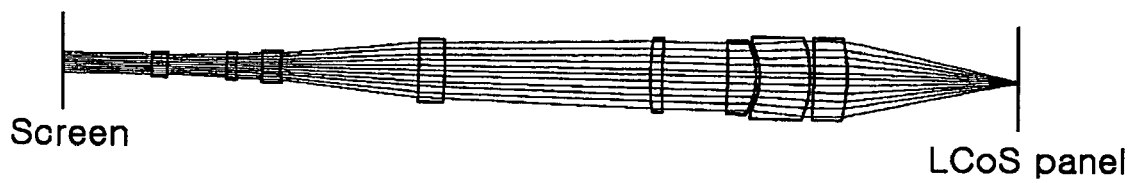
FIG. 10 is a layout diagram of a case where a light reflected on an LCoS panel is advanced without passing through a wire grid type PBS.
Figure 11:
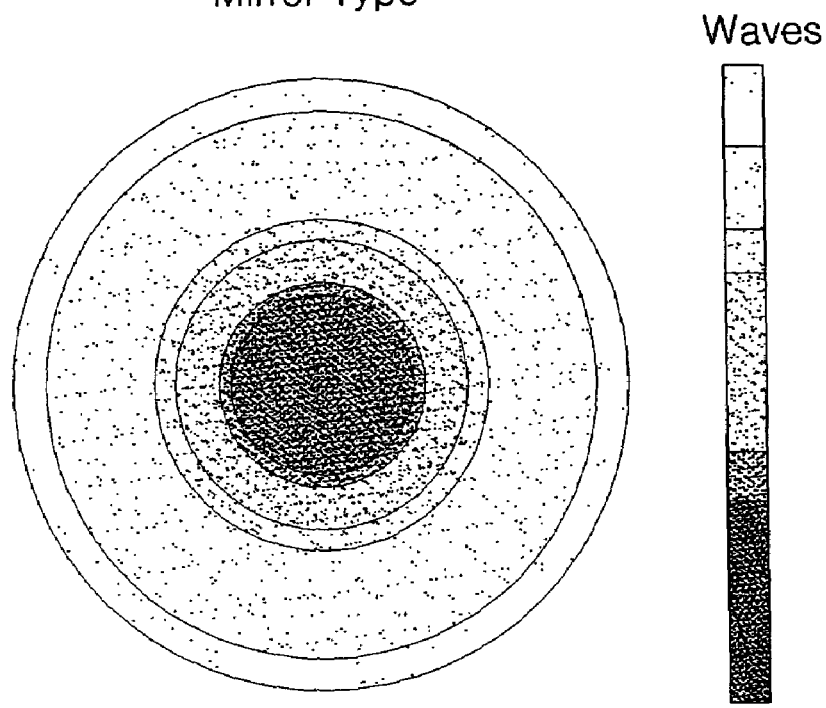
FIGS. 11 and 12 are views illustrating a wave shape in the case of FIG. 10.
Figure 12:
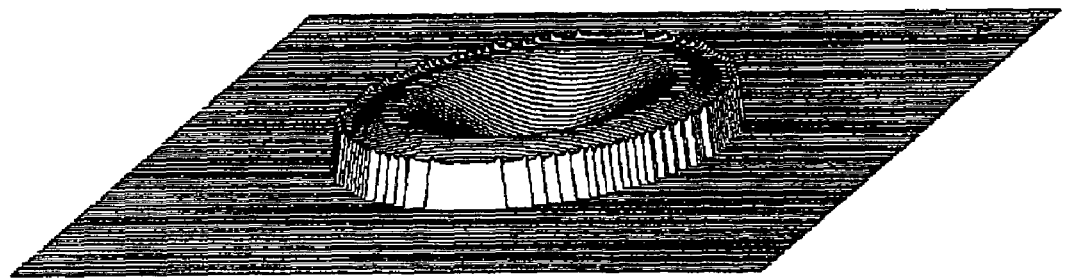

FIG. 10 shows a layout diagram of a case where light reflected on the LCoS panel is advanced without passing through a wire grid type PBS, and FIGS. 11 and 12 illustrates a wave shape in the case of FIG. 10;

When comparing FIG. 10 with FIG. 6, since the light in FIG. 10 is reflected without passing through the wire grid type PBS, FIG. 10 does not depict the wire grid type PBS 50 depicted in FIG. 6.

When comparing FIGS. 11 and 12 with FIGS. 6 to 8, FIGS. 11 and 12 show that astigmatism is not incurred in the present invention.

That is, as the light is reflected on the LCoS panel without passing through the wire grid type PBS, the astigmatism is not generated in the optical system of the present invention.

In addition, when the PBS is attached on a structure with an increased thickness, the bent problem of the PBS can be preventing, without affecting the optical performance.

However, the aforementioned lighting optical system may have a drawback that the back focal length (BFL) is increased due to a limitation in reducing the length between the panel and the projection lens.

The increase in the length of the BFL may cause the efficiency of the projection lens to be lowered, so that it is difficult to obtain a desired performance.

Figure 13:
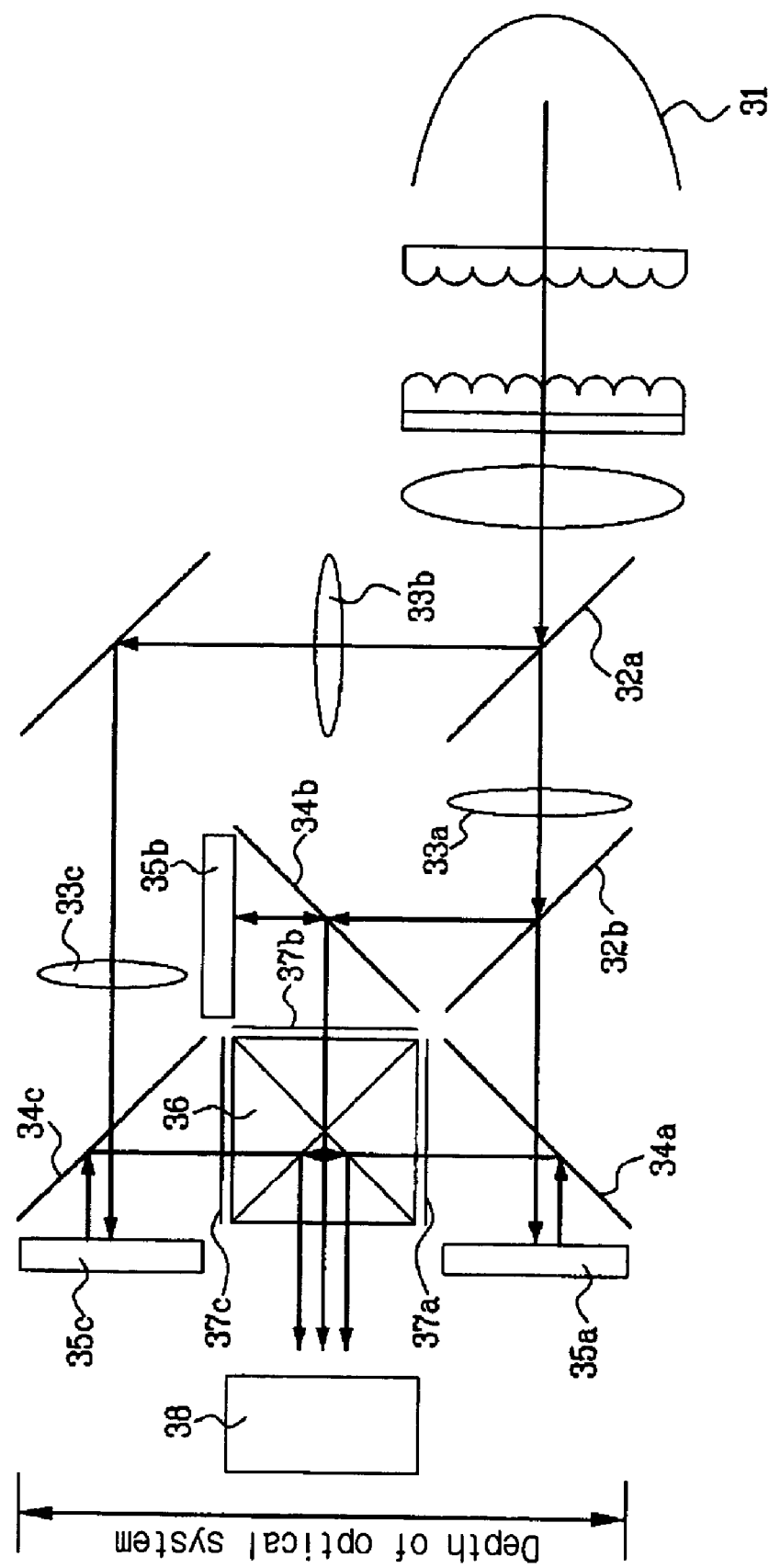
FIG. 13 is a schematic diagram of a reflective lighting optical system according to a second embodiment of the present invention.

To solve the aforementioned drawback, a structure of FIG. 13 according to a second embodiment of the present invention is provided.

The reflective lighting optical system of FIG. 13 is identical to that of the first embodiment except that it is elected with LCoS panels rotated by 90°.

However, the structure of FIG. 13 may also have a drawback that the depth of the optical system is increased and thereby the depth of the actual TV set is increased.

Figure 14:
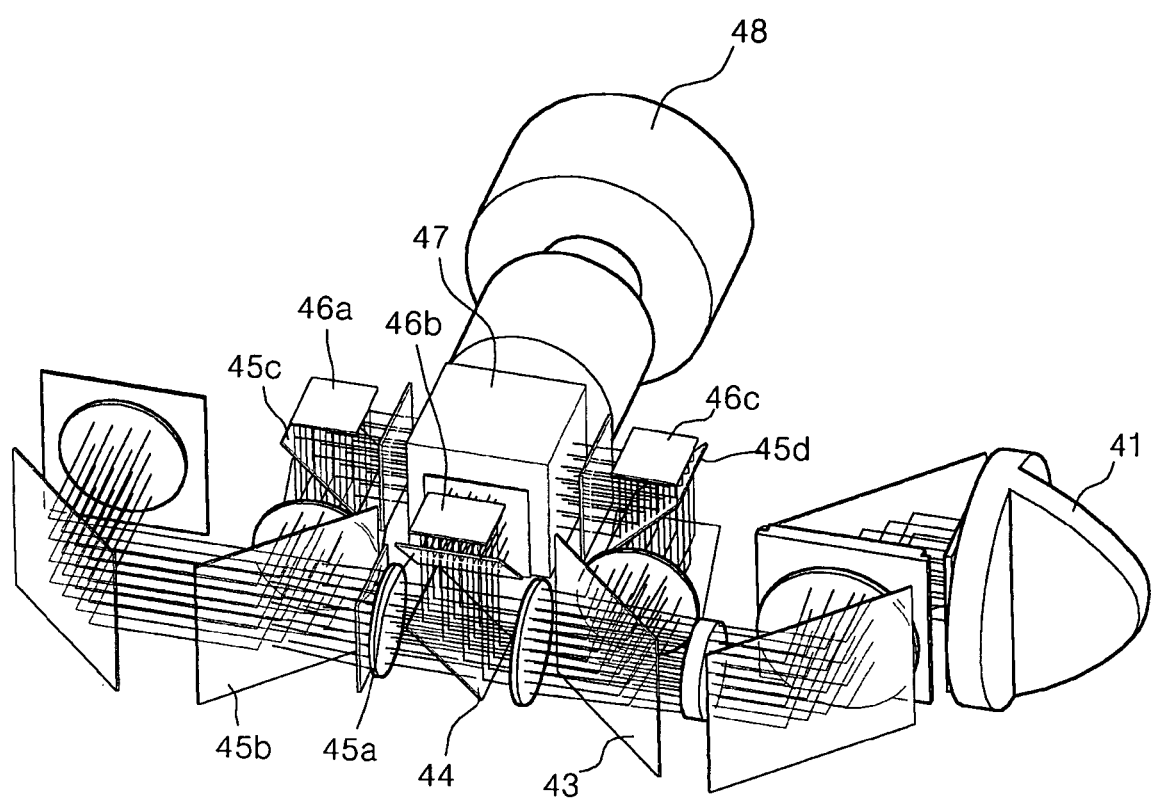
FIG. 14 is a perspective schematic diagram of a reflective lighting optical system according to a third embodiment of the present invention.

To solve the aforementioned drawback, a structure of FIG. 14 is provided.

FIG. 14 illustrates a reflective lighting optical system according to a third embodiment of the present invention.

Figure 15:
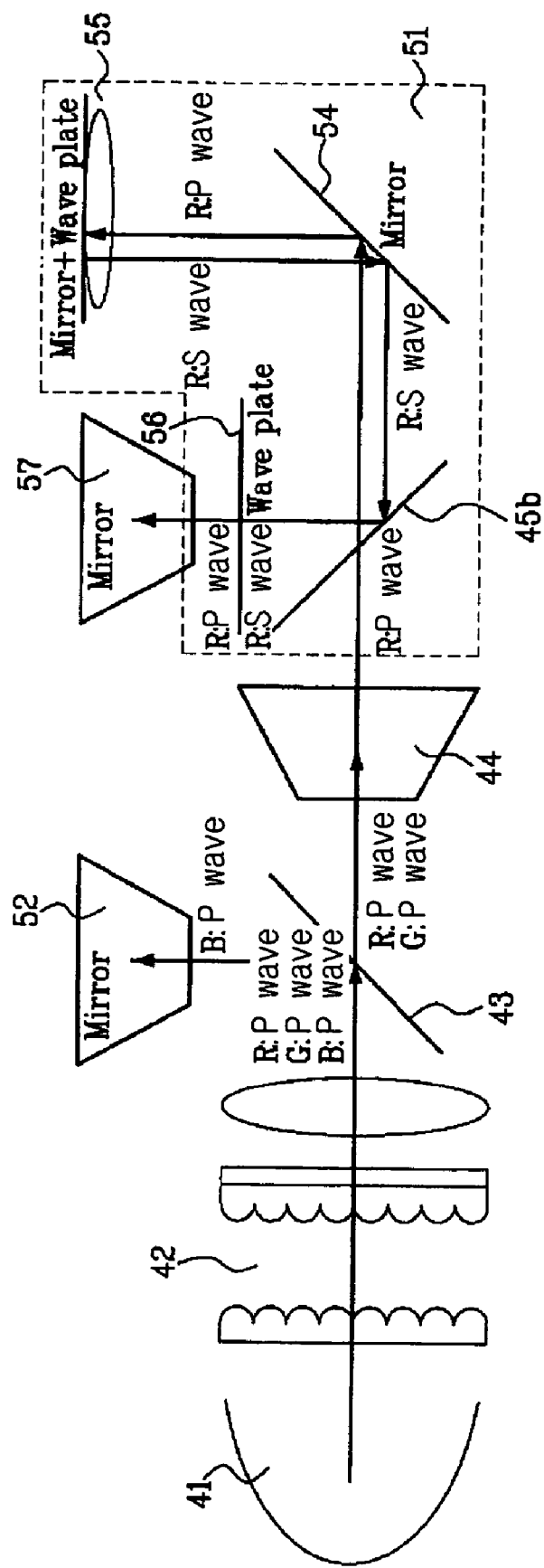
FIG. 15 is a schematic diagram illustrating a lower light path portion of a reflective lighting optical system depicted in FIG. 14.
Figure 16:
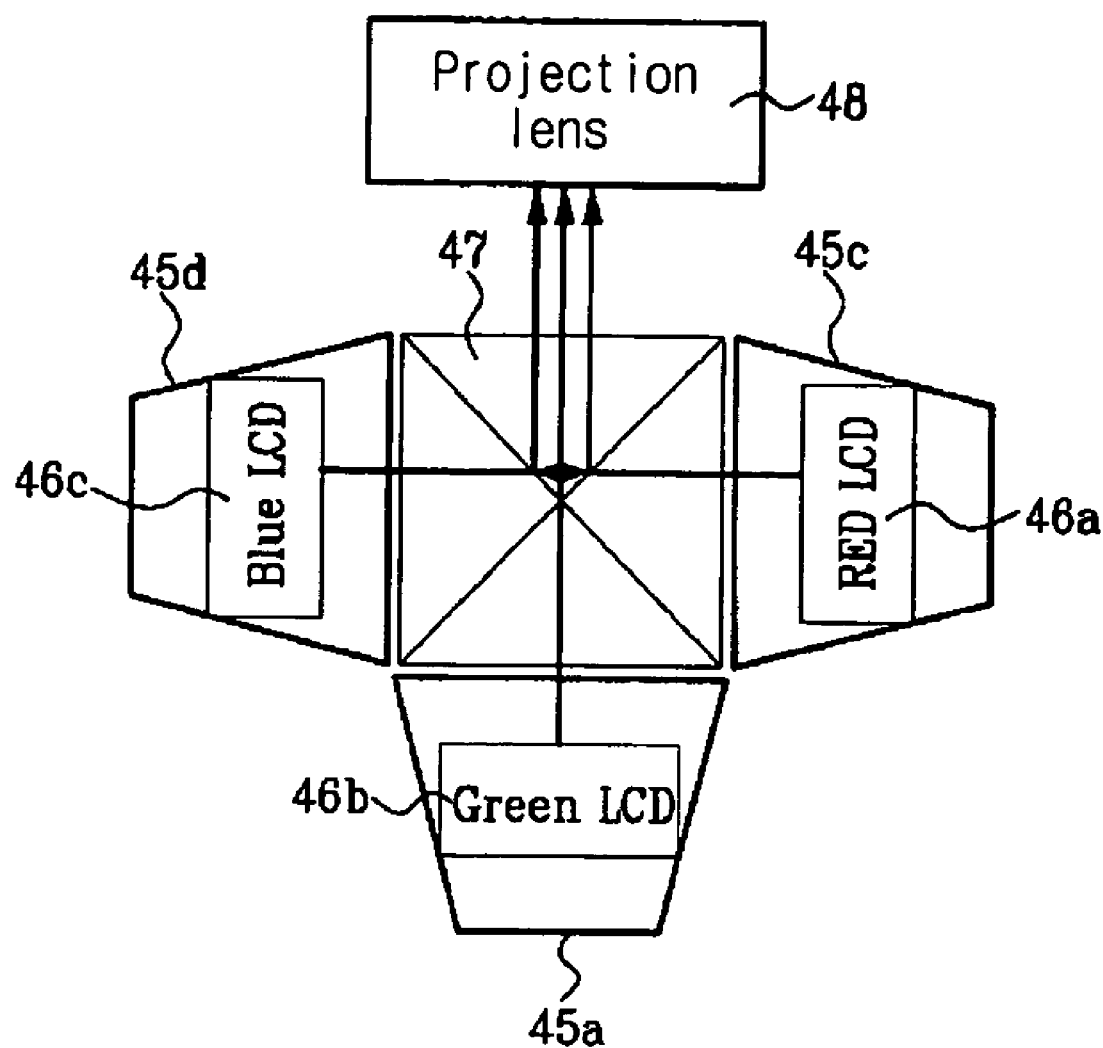
FIG. 16 is a schematic diagram illustrating an upper light path portion of a reflective lighting optical system depicted in FIG. 14.
Figure 17:
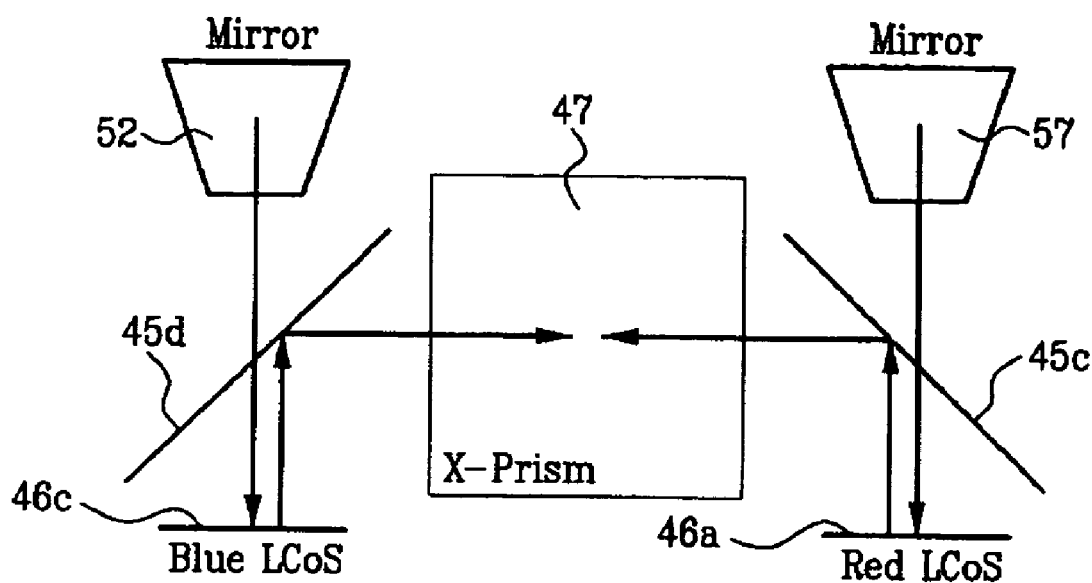
FIG. 17 is a front diagram of a projection lens of a reflective lighting optical system depicted in FIG. 14.

FIGS. 15 and 16 respectively illustrate lower and upper light path portions of a reflective lighting optical system depicted in FIG. 14, and FIG. 17 illustrates a diagram viewed in front of a projection lens of a reflective lighting optical system depicted in FIG. 14.

A lighting optical system according to this embodiment of the present invention has a structure where a film type wire grid type PBS is used. At this time, in order to prevent astigmatism from being generated, light rays of R, G and B that are incident to the projection lens do not pass through the wire grid type PBS but are reflected and then incident to the X-prism.

Also, the lighting optical system has the structure to solve contrast lowering and light amount lowering problems due to the conventional photoelasticity of the PBS by using a polarization film providing the same function as the conventional PBS, i.e., a wire grid type PBS.

The wire grid type PBS enables to realize a P/S division/synthesis at an F/# less than that required for realizing the P/S division/synthesis by the conventional PBS, thereby realizing the brighter lighting system. Here, F/# indicates the angle of illumination light. The decrease in F/# causes the angle of the illumination light to be increased. Thus, when the angle of the illumination light is increased, more much amount of light can be received.

Also, in order to enhance the contrast of light reflected on the film type wire grid type PBS and incident to the projection lens, the inventive optical system employs a structure where a polarization film is interposed between the X-prism and the wire grid type PBS.

Again referring to FIG. 14 illustrating a lighting optical system according to a third embodiment of the present invention having the aforementioned characteristics, the wire grid type PBS is disposed at an oblique angle with respect to a short side of the imager so as to minimize the length (BFL) between the projection lens and the imager, and the three-stage construction of the previous embodiment is changed to a two-stage construction of two planes, thereby reducing the depth of TV set.

As shown in the drawing, a reflective lighting optical system includes: a lamp 41 for radiating red R, green G and blue B light rays; a first dichroic mirror 43 for dividing light radiated from the lamp 31, and of which polarization component is aligned in a direction through a polarization converting system (PCS), into two light paths by a) reflecting a blue light ray radiated from the lamp 41 and b) transmitting green and red light rays of the light; a second dichroic mirror 44 for transmitting the red light ray of yellow light ray (G+R) passing through the first dichroic mirror 43 and for reflecting the green light rays passing through the first dichroic mirror 43; a first wire grid type PBS 45a for transmitting the green light ray reflected on the second dichroic mirror 44 to a second imager (a green LCoS panel) 46b; a second wire grid type PBS 45b for transmitting the red light ray passing through the second dichroic mirror 44 to a red relay system (which will be described later with reference to FIG. 14); a third wire grid type PBS 45c for transmitting the red light ray passing through the red relay system, which compensates for a light path of the red light ray passing through the second wire grid type PBS 45b, to a first imager (a red LCoS panel) 46a; a fourth wire grid type PBS 45d for transmitting the blue light ray reflected on the first dichroic mirror 43 to a third imager (a blue LCoS panel) 46c; and an X-prism 47 for synthesizing the red, green and blue light rays that are reflected on the first, second and third imagers 46a, 46b and 46c, respectively, and further reflected on the third, first and fourth wire grid type PBSs 45c, 45a and 45d, respectively, and for transmitting the synthesized light to a projection lens 48.

Here, a structure of the wire grid type PBS is formed of a glass plate on which a minute strip pattern is formed. Such a structure of the wire grid type PBS is simpler than the conventional PBS, making it easy to process and reducing the costs of the optical system.

In the reflective lighting system constructed as above, the light rays radiated from the lamp 41 is incident to the first dichroic mirror 43 after their polarization components are aligned in a direction while passing through the PCS 42. The first dichroic mirror (the blue light ray is reflected while the green and red light rays passes through) divides the light rays of which the polarization components are aligned into two light paths.

The green light ray is reflected on the second dichroic mirror 44 while the red light ray passes through the dichroic mirror 44.

Thus, the optical system of this embodiment is divided into an upper light path portion for synthesizing light rays and a lower light path portion for illuminating light. The lower light path portion defined on a first horizontal plane is comprised of a light illumination part for illuminating light on the imagers and a color separation part.

The upper light path portion is comprised of the wire grid type PBSs, the imagers (LCoS panels), the X-prism, and the projection lens.

The light illumination and color division parts of the lower light path portion will be described more in detail hereinafter with reference to FIG. 15.

The lower light path portion of the optical system includes: the PCS 42 for aligning the red, green and blue light rays of the light radiated from the lamp 41 as a primary wave; the first dichroic mirror 43 for dividing the blue light ray out of the aligned light rays; a first reflection mirror 52 for reflecting the divided blue light ray to the fourth wire grid type PBS 45d located under the third imager (the blue imager) 46c; the second dichroic mirror 44 for reflecting the green light ray passing through the first dichroic mirror 43 to the first wire grid type PBS 45a located under the second imager (the green imager) 46b and allowing the red light to pass therethrough; a red relay system 51 for reflecting the red light to the third wire grid type PBS 45c located under the first imager (the red imager 46a); and a third reflecting mirror 57.

Here, the red relay system 51 comprises the second wire grid type PBS 45b for transmitting the primary wave red light ray; a second reflection mirror 54 for reflecting the red light ray passing through the second wire grid type PBS 45b; a mirror/wave plate 55 for modulating the primary wave red light ray into the secondary wave red light ray and for reflecting the secondary wave red light ray; a wave plate 56 for (a) receiving the secondary wave red light ray via the second reflection mirror 54 and the second wire grid type PBS 45b, (b) modulating the secondary wave red light ray into the primary wave red light ray, and (c) directing the primary wave red light ray to a third reflection mirror 57.

The red relay system 51 can be formed in a variety of structures to function to compensate for a light path of the red light ray that is different from those of the green and blue light rays.

That is, the red relay system 51 is designed to make a size of the light ray incident to the image identical to those of the green and blue light rays by use of a light path having a sufficient length that is defined by the PBS, the reflection mirror, and the lens.

The upper light path portion of the optical system will be described more in detail hereinafter with reference to FIG. 16.

As shown in the drawing, the upper light path portion is comprised of the wire grid type PBSs, the first, second and third imagers, the X-prism, and the projection lens.

That is, the primary wave red, green and blue light rays each having the primary wave are respectively incident to the first, second and third imagers 46a, 46b and 46c via the respective first, third and fourth wire grid type PBSs 45a, 45c and 45d arranged below the first to third imagers 46a, 46b, 46c.

The first, second and third imagers 46a, 46b and 46c modulates the red, green and blue light rays from the primary wave to the secondary wave in accordance with an image signal. The light rays modulated to the secondary wave are reflected on the wire grid type PBSs to be incident to the X-prism.

Here, in order to enhance the contrast of the light rays before the light rays are incident to the X-prism, polarizing plates may be used.

That is, first, second and third polarizing plates (not shown) may be disposed between the X-prism 47 and the first, third and fourth PBSs 45a, 45c and 45d.

The red, green and blue light rays are synthesized by the X-prism 47 and are then incident to the projection lens 48. An image defined by the synthesized light is projected to a screen.

FIG. 17 shows the optical system viewed in front of the projection lens.

As shown in the drawing, the BFL from the projection lens to the imager can be varied in accordance with the disposition of the imagers and the wire grid type PBSs. As the BFL is reduced, the focusing function of the projection lens is increased while the depth of the system is reduced.

Considering the above, the wire grid type PBSs of the optical system are disposed at an oblique angle with respect to a short side of the wire grid type PBSs to minimize the BFL of the optical system such that all of the imagers can be disposed on the identical horizontal plane, thereby simplifying a structure of a drive board.

To prevent a depth of the TV set from increasing when the optical system is vertically mounted in the TV set, the optical system is basically divided into upper and lower portions.

Figure 18:
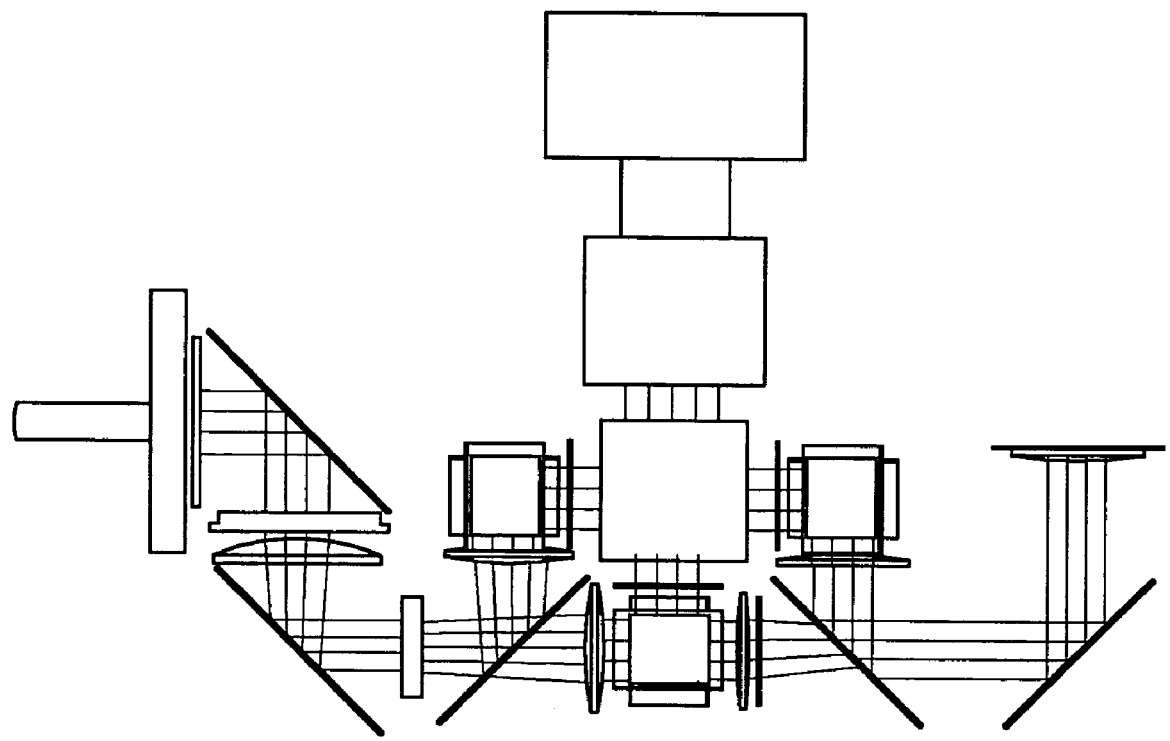
FIGS. 18 and 19 are diagrams illustrating two light path portions in each of the vertical and horizontal directions of an optical system depicted in FIG. 14.
Figure 19:
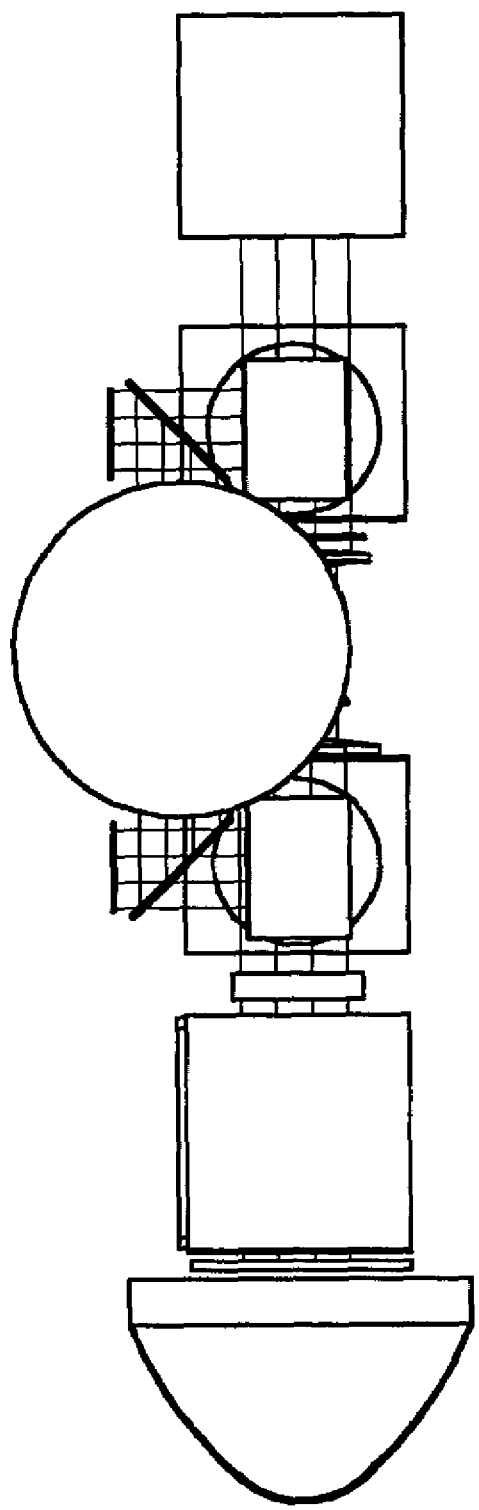

As shown in FIGS. 18 and 19, the optical system of the present invention is comprises of two portions in a vertical direction and two portions in a horizontal direction, thereby reducing the depth of the optical system.

That is, FIG. 18 is a bottom view of FIG. 14, illustrating the two-portion structure of the optical system in the vertical direction, and FIG. 19 is a front view of FIG. 14, illustrating the two-portion structure of the optical system in the horizontal direction.

As described above, since the 3-panel type optical system of the present invention employs a wire grid type PBS formed in a flat-shape using a polymer material, it becomes possible to reduce the depth of the optical system as compared with the conventional optical system. In addition, the BFL and the height of the optical system can be minimized.

The reflective lighting optical system of the present invention has a variety of advantages as follows:

Since the wire grid type PBS is employed for the 3-panel type optical system, the photoelasticity problem can be solved;

The contract of the light incident to the projection lens can be improved by disposed a polarizing plate between the X-prism and the wire grid type PBS;

As the light is incident to the projection lens by being reflected on the LCoS panel without passing through the wire grid type PBS, the astigmatism is not incurred;

The optical system can be simplified as compared with the conventional optical system formed having two or three light path portions, thereby reducing the manufacturing costs; and Since the wire grid type PBSs of the optical system are disposed at an oblique angle with respect to the short side of the wire grid type PBSs, the BFL of the optical system can be

What is claimed is:

1. A reflective lighting optical system comprising:
 a lighting part disposed at a lower side of the optical system, the lighting part including a lamp for radiating lights and a dichroic mirror for allowing the lights of red, green and blue, which are radiated from the lamp and of which polarization components are aligned, to be divided into their respective paths; and
 a synthesizing part disposed at an upper side of the optical system, the synthesizing part including an imager for phase-shifting and reflecting the red, green and blue lights, a PBS disposed at an oblique angle with respect to the imager, for transmitting the red, green and blue lights divided into their respective paths by the dichroic mirror and for reflecting the red, green and blue light rays phase-shifted and reflected on the imager, and an X-prism for synthesizing the red, green and blue lights to allow the synthesized light to be incident to a projection lens;
 wherein the imager includes a plurality of sub-imagers, each of the sub-imagers corresponding to one of the red, green and blue lights, the plurality of sub-imagers being horizontally disposed on an identical horizontal plane.

2. The reflective lighting optical system according to claim 1, further comprising a polarizing plate disposed between the X-prism and the PBS.

3. The reflective lighting optical system according to claim 1, wherein the lighting part further comprises a relay system for compensating for at least one of the light paths for the respective red, green and blue light rays.

4. The reflective lighting optical system according to claim 3, wherein the relay system comprises a PBS for transmitting primary or secondary wave, a mirror/wave plate for modulating a phase of incident light and for reflecting the modulated light to the PBS in P wave or S wave, and a wave plate for modulating the phase of the light reflected on the PBS.

5. The reflective lighting optical system according to claim 1, wherein the PBS is disposed at the oblique angle with respect to a lateral side of the imager.

6. The reflective lighting optical system according to claim 1, wherein the PBS is a film type.

7. The reflective lighting optical system according to claim 1, wherein the dichroic mirror comprises:
 a first dichroic mirror for transmitting the blue light ray and for reflecting the green and red light rays; and
 a second dichroic mirror for transmitting the red light ray and for reflecting the green light ray.

8. The reflective lighting optical system according to claim 1, further comprising one or more reflection mirrors disposed on the light paths for the respective red, green and blue light rays to minimize an area of the optical system.

9. The reflective lighting optical system according to claim 1, wherein the PBS is a wire grid type PBS.

10. A reflective lighting optical system comprising:
 a lamp for radiating light;
 a dichroic mirror for allowing the light rays of red, green and blue, which are radiated from the lamp and of which polarization components are aligned, to be divided into their respective paths;
 an imager for phase-shifting and reflecting the red, green and blue light rays;
 a PBS disposed at an oblique angle with respect to the imager, for transmitting the red, green and blue light rays divided into their respective paths by the dichroic mirror and for reflecting the red, green and blue light rays phase-shifted and reflected on the imager; and
 an X-prism for synthesizing the red, green and blue light rays reflected on the PBS to allow the synthesized light to be incident to a projection lens;
 wherein the lamp and the dichroic mirror are disposed at a lower side of the optical system, and the imager, the PBS and the X-prism are disposed at an upper side of the optical system;

wherein the imager is disposed at an upper side of the PBS and the imager includes a plurality of sub-imagers, each of the sub-imagers corresponding to one of the red, green and blue lights, the plurality of sub-imagers being horizontally disposed on an identical horizontal plane.

11. The reflective lighting optical system according to claim 10, further comprising a polarizing plate disposed between the X-prism and the PBS.

12. The reflective lighting optical system according to claim 10, wherein the PBS is a film type.

13. The reflective lighting optical system according to claim 10, further comprising a relay system for compensating for at least one of the light paths for the respective red, green and blue light rays, wherein the relay system comprises a PBS for transmitting primary or secondary wave, a mirror/wave plate for modulating a phase of incident light and for reflecting the modulated light to the PBS in P wave or S wave, and a wave plate for modulating the phase of the light reflected on the PBS.

14. The reflective lighting optical system according to claim 10, wherein the PBS is a wire grid type PBS.

15. A reflective lighting optical system comprising:
a lamp for radiating light;
a dichroic mirror for allowing the light rays of red, green and blue, which are radiated from the lamp and of which polarization components are aligned, to be divided into their respective paths;
an imager for phase-shifting and reflecting the red, green and blue light rays;
a PBS disposed at an oblique angle with respect to the imager, for transmitting the red, green and blue light rays divided into their respective paths by the dichroic mirror and for reflecting the red, green and blue light rays phase-shifted and reflected on the imager; and
an X-prism for synthesizing the red, green and blue light rays reflected on the PBS to allow the synthesized light to be incident to a projection lens;
wherein the lamp and the dichroic mirror are disposed at a lower side of the optical system, and the imager, the PBS and the X-prism are disposed at an upper side of the optical system, and
wherein the imager includes a plurality of sub-imagers, each of the sub-imagers corresponding to one of the red, green and blue lights, the plurality of sub-imagers being horizontally disposed on an identical horizontal plane.

* * * * *